Dec. 1, 1970     A. P. KELLEY ET AL     3,543,520

AUGMENTED RAMJET ENGINE

Filed Aug. 23, 1968     2 Sheets-Sheet 1

INVENTORS.
ARCHIBALD P. KELLEY
ALLAN D. MESHEW

BY *Herschel C. Omohundro*

ATTORNEY

INVENTORS.
ARCHIBALD P. KELLEY
ALLAN D. MESHEW
BY
Herschel C. Omohundro
ATTORNEY

United States Patent Office 3,543,520
Patented Dec. 1, 1970

3,543,520
AUGMENTED RAMJET ENGINE
Archibald P. Kelley, Scottsdale, and Allan D. Meshew,
Tempe, Ariz., assignors to The Garrett Corporation,
Los Angeles, Calif., a corporation of California
Filed Aug. 23, 1968, Ser. No. 754,875
Int. Cl. F02k 3/04; F02c 3/14
U.S. Cl. 60—269         1 Claim

ABSTRACT OF THE DISCLOSURE

The helicopter blade tip propulsion means herein is provided to augment the operation of substantially conventional ramjet engines. The augmentation means consists of providing a ramjet engine of the type having a substantially ovoid casing with an open subsonic diffuser end and a converging outlet nozzle, with means for increasing inlet air flow, injecting fuel into such increased air flow, and burning the mixture upstream of the nozzle for discharge therefrom. One means for increasing the inlet air flow comprises the location of a manifold at the inner end of the diffuser and locating jet nozzles substantially uniformly over the cross sectional area of the casing to discharge air under pressure from a source in the helicopter fuselage from the nozzles to increase the flow. Injecting fuel and burning it in the augmented air flow also increases the mass flow through the outlet nozzle. Another means for accomplishing the same end is to place a fan in the casing and drive it with compressed air from the source in the fuselage. Use of a tip turbine on the fan is contemplated. These measures serve to start and accelerate the rotation of helicopter blades to a rate at which ramjet engines become effective. Also, they may assist in take-off or landing under excessively loaded conditions.

SUMMARY

This invention relates generally to power plants of the type used in aircraft. More specifically, it relates to means for augmenting the operation of ramjet engines employed on helicopter rotors to improve their starting and thrust capabilities. Still more specifically, the invention relates to the incorporation in a helicopter blade tip mounted ramjet engine of means powered by air under pressure from a source in the helicopter fuselage and operative to increase or boost the inlet air mass flow to broaden the period of use of the ramjet engine and increase its effectiveness during normal operating periods.

Conventional ramjet engines are inefficient at low tip speeds of helicopter rotor blades and the rotors must be spun by some auxiliary means to initiate the starting operations of the ramjets since the latter deliver no static thrust. To overcome these defects, it is proposed to add to the ramjets a simple means for boosting inlet air pressure, thus giving the effect of movement of the engine through the air. This proposed solution is accomplished in one instance by providing the air passage in a ramjet engine with a manifold which is supplied with air under pressure from a source in the helicopter fuselage. The manifold is formed with jet nozzles arranged to discharge diverging streams of air downstream of the ramjet passage to increase the inlet air flow and pressure in the vicinity of fuel spraying means. The combustion of the fuel and air mixture and discharge of the resulting hot gases from the ramjet nozzle impels the engine and its support (the helicopter rotor blade) in a forward direction. No other rotor driving power is then required.

Another instance in which the above defects may be overcome is to add to a ramjet engine a fan for boosting inlet air pressure and augmenting air flow. This fan is arranged at the downstream end of the diffuser and substantially covers the cross sectional area of the passage through the casing. Driving means operated by air from a source in the helicopter fuselage effects the operation of the fan to accelerate the movement and increase the inlet air pressure and mass flow in the region of fuel injecting means. As previously mentioned, the combustion of the fuel-air mixture produces gases which discharge from the nozzle and propel the engine. With either of these solutions the helicopter rotor can be initially rotated without other driving means and consequent cumbersome expensive motion-transmitting mechanism.

THE DRAWINGS

Figure 1:
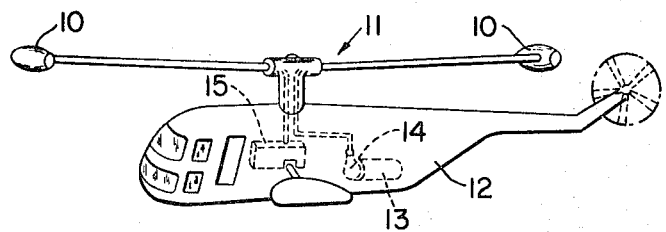
FIG. 1 is a perspective view of a helicopter provided with blade tip propulsion means embodying the present invention.

Reference to the drawings will show that the subject matter of the present invention pertains to means for augmenting the operation of ramjet engines 10, which are affixed to and effect the rotation of the main rotor 11 of a helicopter 12. This helicopter will be provided with a suitable auxiliary power unit 13 driving a compressor 14, these elements being disposed in the helicopter fuselage. Also carried by the latter is a fuel tank 15 constituting a pressurized fuel source. Suitable electrical generation or storage devices (not shown) may also be included.

Figure 2:
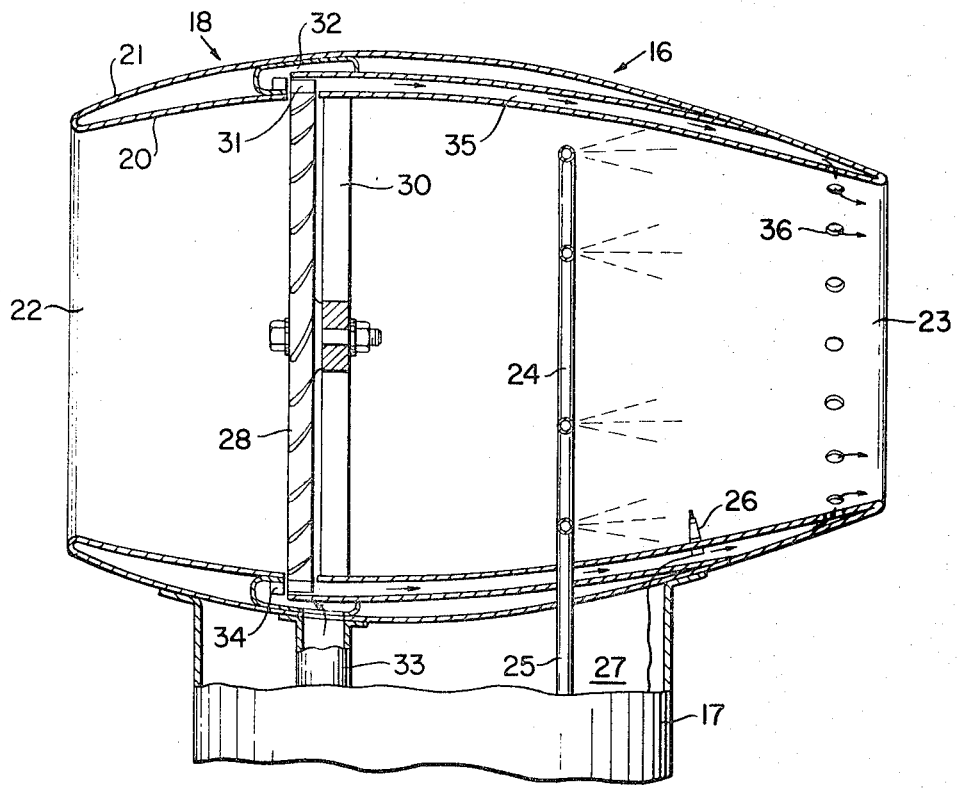
FIG. 2 is a plan view of the outer end of a blade of the helicopter shown in FIG. 1, parts being shown in section to illustrate normally hidden details.
Figure 3:
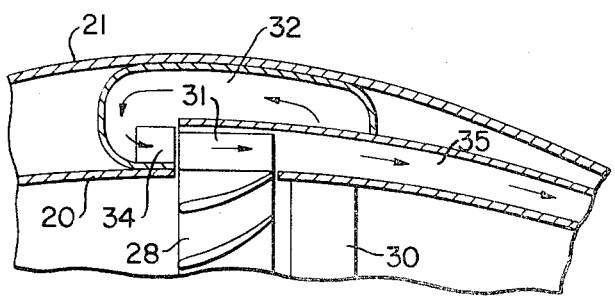
FIG. 3 is a detail view on an enlarged scale of a portion of ramjet engine.

What is believed to be the preferred form of the invention is illustrated in detail in FIGS. 2 and 3. FIG. 3 shows an axial sectional view taken through a ramjet engine 16 secured to the outer end of a blade 17 forming part of the helicopter rotor. The engine 16 may be substantially of conventional construction, the one illustrated having a casing 18 formed of suitably joined pieces to provide an ovoid body. In the engine illustrated, inner and outer casings 20 and 21 have been utilized. The casing is open at its forward end 22, the liner being shaped to provide a subsonic diffuser section. The rear end of the casing is open, as at 23, and shaped to provide a converging thrust nozzle. Fuel injection means 24 are located upstream of the nozzle and receive fuel under pressure from the source 15 in the helicopter fuselage. Suitable outlets are provided and may be formed with nozzles to effect the dispersion of the fuel in the air flowing through the casing. A supply tube 25 leads from the source of fuel through the blade 17 to the fuel injection means. This means may be of any suitable shape, preferably being designed to effect the most efficient distribution of fuel in the air stream. The inner casing is equipped downstream of the fuel injection means with ignition means 26 supplied with electrical energy through a duct 27. The engine thus far described constitutes a ramjet engine which depends upon forward motion at a predetermined rate to effect the operation. It is well known that without such forward motion, such engines will not become operative.

One of the features of this invention is to equip such an engine with means for augmenting the air throughflow and increasing pressure to cause combustion and generation of gases for exhaust through the thrust nozzle to cause the engine to move in a forward direction. In FIGS. 2 and 3 this means constitutes a fan 28 which is supported for rotary movement by a spider or frame 30 mounted within the casing. The fan selected for illustration constitutes a tip turbine fan and is provided at its periphery with blades 31 disposed in a torus 32 provided in the casing. This torus is connected by a duct 33 with the compressor 14 or other source of air under pressure. Suitable inlet vanes 34 may be provided in advance of the blades to direct the air under pressure from the torus against the turbine blades to effect high-speed operation of the fan.

The casing is further provided with an exhaust passage 35 through which air flowing from the turbine may be conducted to an outlet. In this instance, suitable openings 36 are arranged in the inner lining of the casing to permit the exhaust air to enter the fluid stream flowing through the casing and be discharged through the nozzle 23.

One of the features of this invention is to drive the fan to cause air to be drawn in through the inlet 22, increase the pressure of such air and combine it with fuel for combustion to produce motivating gases. It should be obvious that even though fuel for the mixture is not provided, the flow of air resulting from the operation of the fan will tend to move the engine and its support, i.e., the helicopter rotor, through the air. Superior results will, of course, be secured by supplying the fuel and burning the mixture, which is then expanded through a nozzle to produce additional thrust.

It should be noted that the fan is disposed axially of the casing at a point substantially adjacent to the downstream end of the inlet diffuser. The fan extends substantially over the entire cross sectional area of the casing so that the inlet air pressure will be boosted in the vicinity of the fuel injection means. It is within the concept of this invention to drive the fan by means other than a tip turbine, a point of primary importance being the utilization of air under pressure from the source within the helicopter fuselage.

Figure 4:
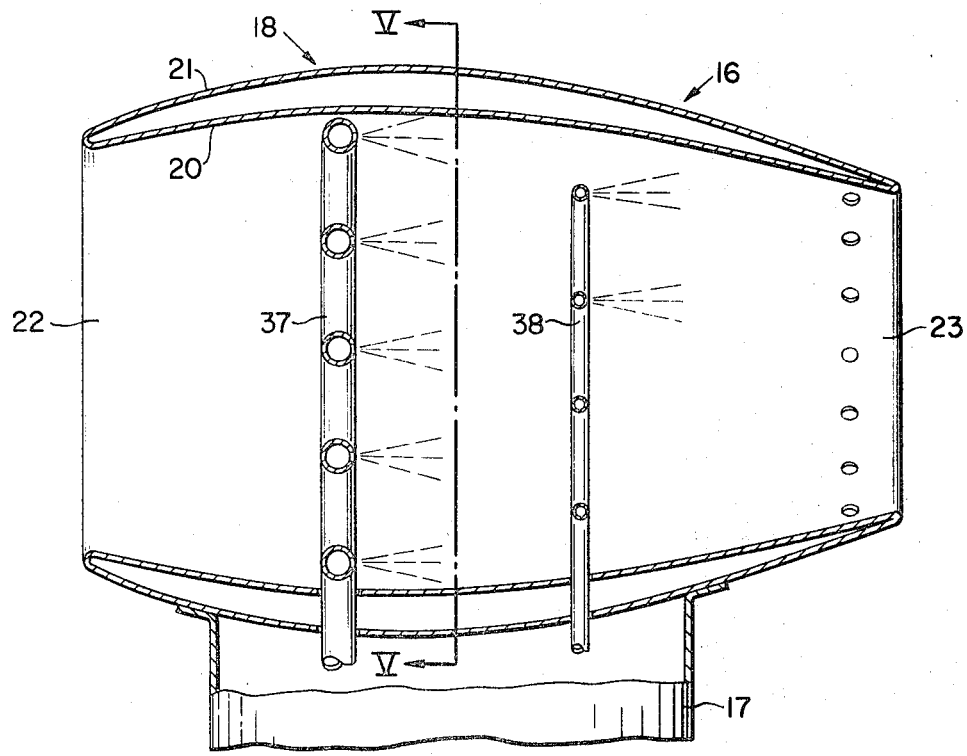
FIG. 4 is a view similar to FIG. 2 showing modified means for increasing inlet air pressure in a rotor blade tip propulsion engine.
Figure 5:
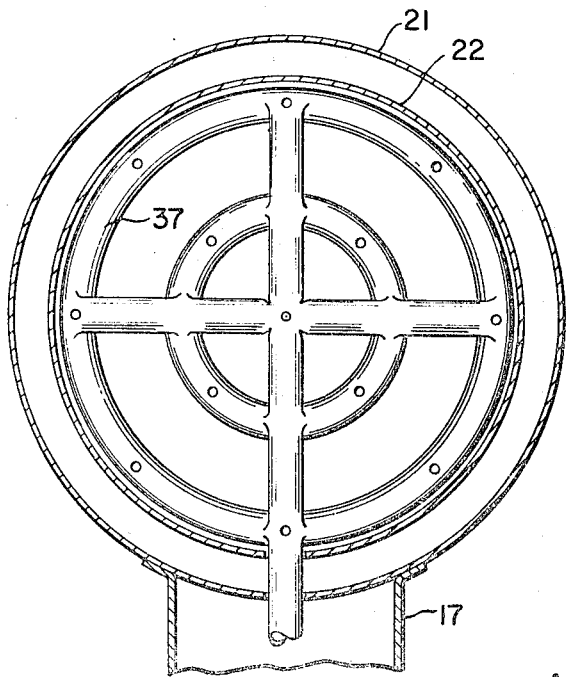
FIG. 5 is a vertical transverse sectional view taken on the plane indicated by line V—V of FIG. 4.

In FIGS. 4 and 5 a modified form of the invention has been illustrated. In this form, air injection means has been substituted for the fan. It is disposed in a location similar to that of the fan 28 and constitutes a suitable manifold 37 to which air under pressure is supplied. This manifold is provided with outlets spaced substantially uniformly over the cross sectional area of the air passage in the ramjet so that fluid issuing from the jets will induce the flow of additional air into the inlet and compress such air in a region upstream of the thrust nozzle. In this form, also, fuel injection means 38 has been provided. Suitable ignition means for initiating combustion will be supplied. The operation of this form of the invention is similar to that of the first form. Air under pressure supplied to the manifold 37 flowing from the jet nozzles induces additional air flow into the casing and the discharge of a thrust jet from the outlet nozzle to propel the engine in a forward direction. The quantity and velocity of fluid to be discharged will obviously be increased by the introduction of fuel to the air and the combustion of the mixture.

The proposed apparatus would compare with prior rotor tip propulsion schemes and have the advantage of the same thrust as follows:

(1) Lower nacelle drag than the pure ramjet.
(2) Lower specific fuel consumption than the pure ramjet.
(3) Reduced bleed air consumption as compared with the simple pressure jet.
(4) Self-starting in that the rotor blade could be spun up to operating speed by the primary bleed air alone.
(5) Lower noise than the simple jet since the fluid shear velocities in the exhaust stream are lower for the augmented ramjet.

For purposes of comparison of the relative advantages of this invention in helicopter rotor blade tip propulsion, three schemes are compared, all based upon 100# of thrust and a tip speed of 600 ft. per second, sea level standard day atmospheric conditions. Bleed air is supplied to the rotor blade tip at a pressure of 45 p.s.i.g. and a temperature of 230° F.

|  | Simple ramjet | Simple pressure jet | Injector augmented ramjet |
|---|---|---|---|
| Bleed flow, No./sec | 0 | 2.14 | .555 |
| Fuel, flow, No./hr | 826 | 0 | 412 |
| Nozzle area, in.² | 64.9 | .75 | 23.9 |

It is seen that the augmented ramjet, in this case, has roughly one-quarter the bleed air requirement of the simple pressure jet and nearly one-third the size (exhaust area) of the simple ramjet with one-half the fuel flow. A similar comparison exists when the augmentation means is the top turbine driven fan previously described.

We claim:
1. An augmented ramjet engine, comprising:
 (a) means forming a substantially ovoid outer body with an open inlet end, inner wall means shaped to form a subsonic diffuser extending rearwardly from the inlet end and terminating in a converging thrust nozzle at the outlet end, intermediate wall means between the inner wall means and outer body shaped to form a manifold and an annular passage leading rearwardly therefrom to exhaust openings formed in the inner wall immediately upstream of the thrust nozzle at the outlet end;
 (b) spaced nozzle vanes in said body between said manifold and said annular passage;
 (c) rotor means extending transversely of said body at the rear of said diffuser, said rotor means being supported for rotation and having fan blades operative to induce air flow into said inlet and through said body;
 (d) turbine blades projecting from the periphery of said rotor means into the annular passage at the outlet end of said nozzle vanes, fluid under pressure supplied to said manifold flowing between said nozzle vanes and engaging said turbine blades to impart rotary movement to said fan blades;
 (e) injector means downstream of said rotor means for mixing fuel with air flowing from said fan; and
 (f) ignition means adjacent said injector means to initiate combustion of the fuel and air mixture, the resulting gases issuing from said thrust nozzle to propel said body in a forward direction, fluid exhausted from said turbine tending to absorb heat from said inner wall and flow through said exhaust openings to mix with the gases of combustion and further augment forward thrust of said body.

References Cited

UNITED STATES PATENTS

| 2,780,424 | 2/1957 | Price | 60—269 |
| 2,850,872 | 9/1958 | Stockbarger | 60—270 |
| 2,917,895 | 12/1959 | Boushey | 60—39.35 |
| 3,186,491 | 6/1965 | Fischer | 170—135.4 |

FOREIGN PATENTS

| 514,811 | 11/1939 | Great Britain. |
| 715,391 | 9/1954 | Great Britain. |
| 793,823 | 4/1958 | Great Britain. |
| 938,459 | 10/1963 | Great Britain. |
| 1,027,266 | 2/1953 | France. |

DOUGLAS HART, Primary Examiner

U.S. Cl. X.R.

60—39.35